(12) United States Patent
Noguchi

(10) Patent No.: US 9,021,230 B2
(45) Date of Patent: Apr. 28, 2015

(54) STORAGE DEVICE

(75) Inventor: Yoshiaki Noguchi, Toyko (JP)

(73) Assignee: NEC Corporation, Tokyo (JP)

( * ) Notice: Subject to any disclaimer, the term of this patent is extended or adjusted under 35 U.S.C. 154(b) by 157 days.

(21) Appl. No.: 13/577,862

(22) PCT Filed: Oct. 19, 2010

(86) PCT No.: PCT/JP2010/006171
§ 371 (c)(1),
(2), (4) Date: Aug. 8, 2012

(87) PCT Pub. No.: WO2011/099099
PCT Pub. Date: Aug. 18, 2011

(65) Prior Publication Data
US 2012/0311294 A1  Dec. 6, 2012

(30) Foreign Application Priority Data
Feb. 10, 2010  (JP) .................................. 2010-027125

(51) Int. Cl.
*G06F 3/06* (2006.01)
*G06F 12/02* (2006.01)
*G06F 13/10* (2006.01)

(52) U.S. Cl.
CPC ............ *G06F 3/0608* (2013.01); *G06F 3/0659* (2013.01); *G06F 3/0689* (2013.01)

(58) Field of Classification Search
None
See application file for complete search history.

(56) References Cited

U.S. PATENT DOCUMENTS

| 4,412,285 | A  | * | 10/1983 | Neches et al. ................. 714/4.2 |
| 7,020,749 | B2 | * | 3/2006  | Azuma ......................... 711/137 |
| 7,200,626 | B1 | * | 4/2007  | Hoang et al. ........... 707/999.204 |
| 7,222,133 | B1 | * | 5/2007  | Raipurkar et al. ............ 707/642 |
| 2002/0004912 | A1 | * | 1/2002 | Fung ............................. 713/300 |

(Continued)

FOREIGN PATENT DOCUMENTS

| GB | 2236204 A | * | 3/1991 | ............. G06F 12/02 |
| JP | 2-58768 A |   | 2/1990 | |

(Continued)

OTHER PUBLICATIONS

Communication dated Dec. 17, 2013, issued by the Japanese Patent Office in corresponding Application No. 2011-553663.

*Primary Examiner* — Daniel Bernard
(74) *Attorney, Agent, or Firm* — Sughrue Mion, PLLC

(57) ABSTRACT

A storage device includes: a temporary buffer for sequentially storing data configuring a file requested to be written for every reception from outside; a data writing means for immediately separating the data in the temporary buffer into mutually corresponding data portion and marker portion classified by preset criteria and storing into a data storing means in an associated state, and deleting from the temporary buffer; an unseparated data writing means for storing the data that cannot be separated into the data portion and the marker portion among the data in the temporary buffer, into an unseparated data storing means; and a re-separation processing means for separating the data in the unseparated data storing means into the data portion and the marker portion by preset criteria and storing into the data storing means with the data portion and the marker portion associated, and deleting from the unseparated data storing means.

9 Claims, 14 Drawing Sheets

(56) References Cited

U.S. PATENT DOCUMENTS

| | | | |
|---|---|---|---|
| 2004/0052501 A1* | 3/2004 | Tam | 386/46 |
| 2004/0190171 A1* | 9/2004 | Nakai | 360/39 |
| 2005/0195975 A1* | 9/2005 | Kawakita | 380/30 |
| 2006/0209820 A1* | 9/2006 | Arai et al. | 370/389 |
| 2008/0215566 A1* | 9/2008 | Brooks | 707/7 |
| 2009/0070356 A1 | 3/2009 | Mimatsu | |
| 2009/0226088 A1* | 9/2009 | Okazawa | 382/173 |
| 2011/0072058 A1* | 3/2011 | Tang et al. | 707/823 |

FOREIGN PATENT DOCUMENTS

| | | |
|---|---|---|
| JP | 03-094346 A | 4/1991 |
| JP | 2005-235171 A | 9/2005 |
| JP | 2009-70361 A | 4/2009 |
| JP | 2009-212834 A | 9/2009 |
| JP | 2011-523738 A | 8/2011 |
| WO | 2009/140590 A1 | 11/2009 |

\* cited by examiner

Fig.7
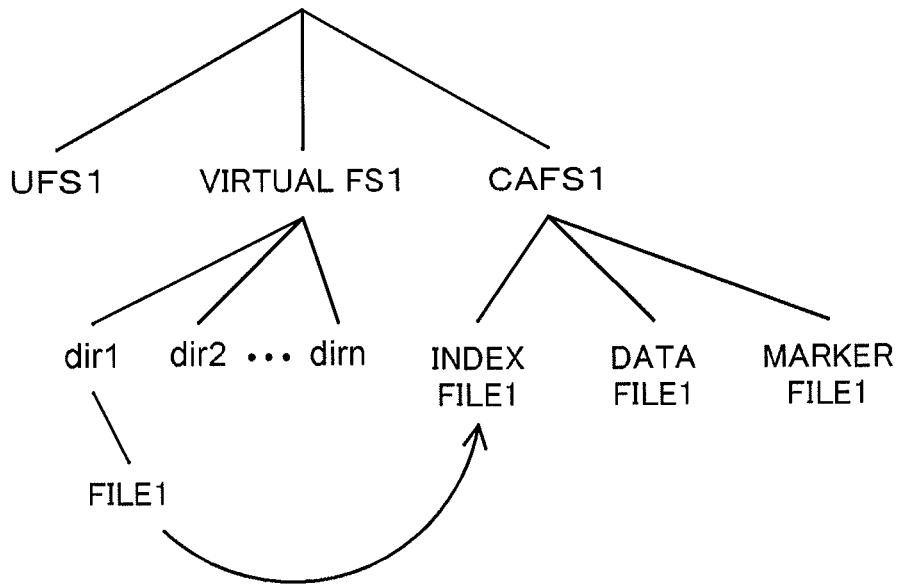
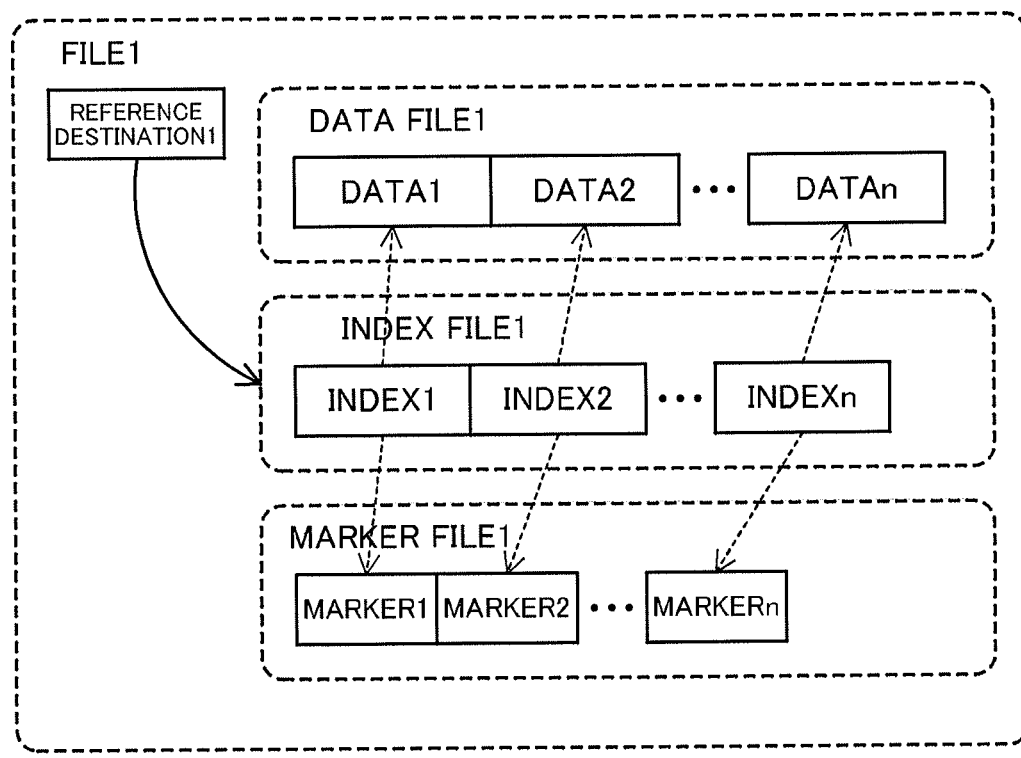

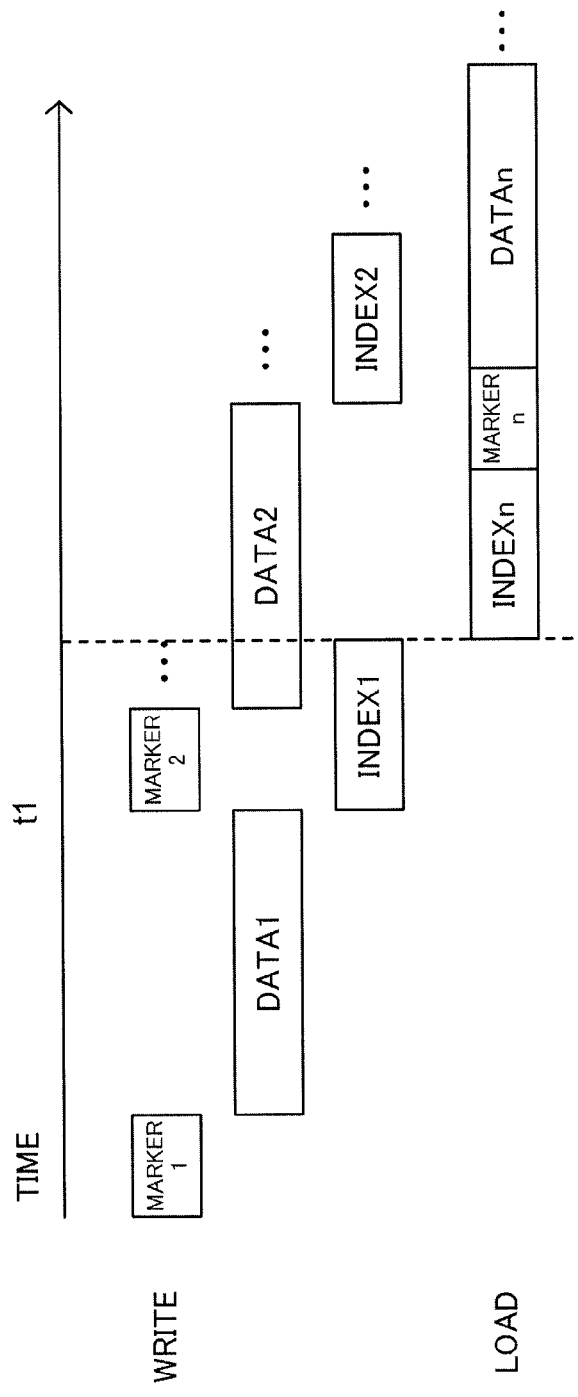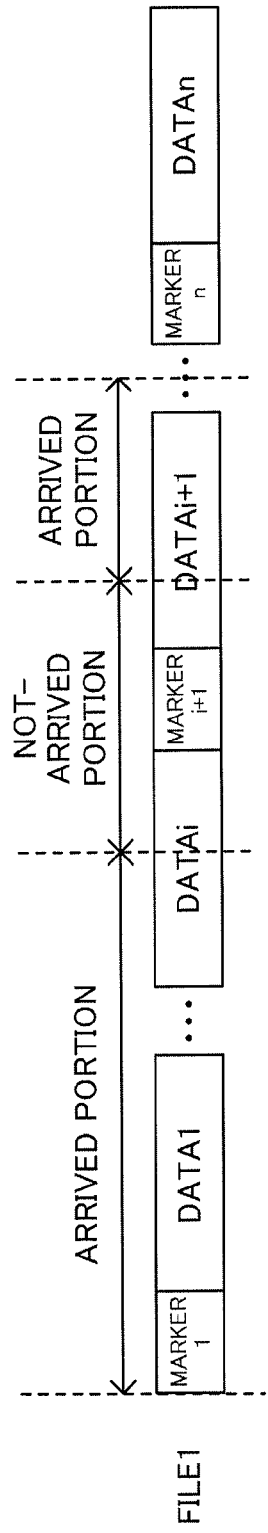

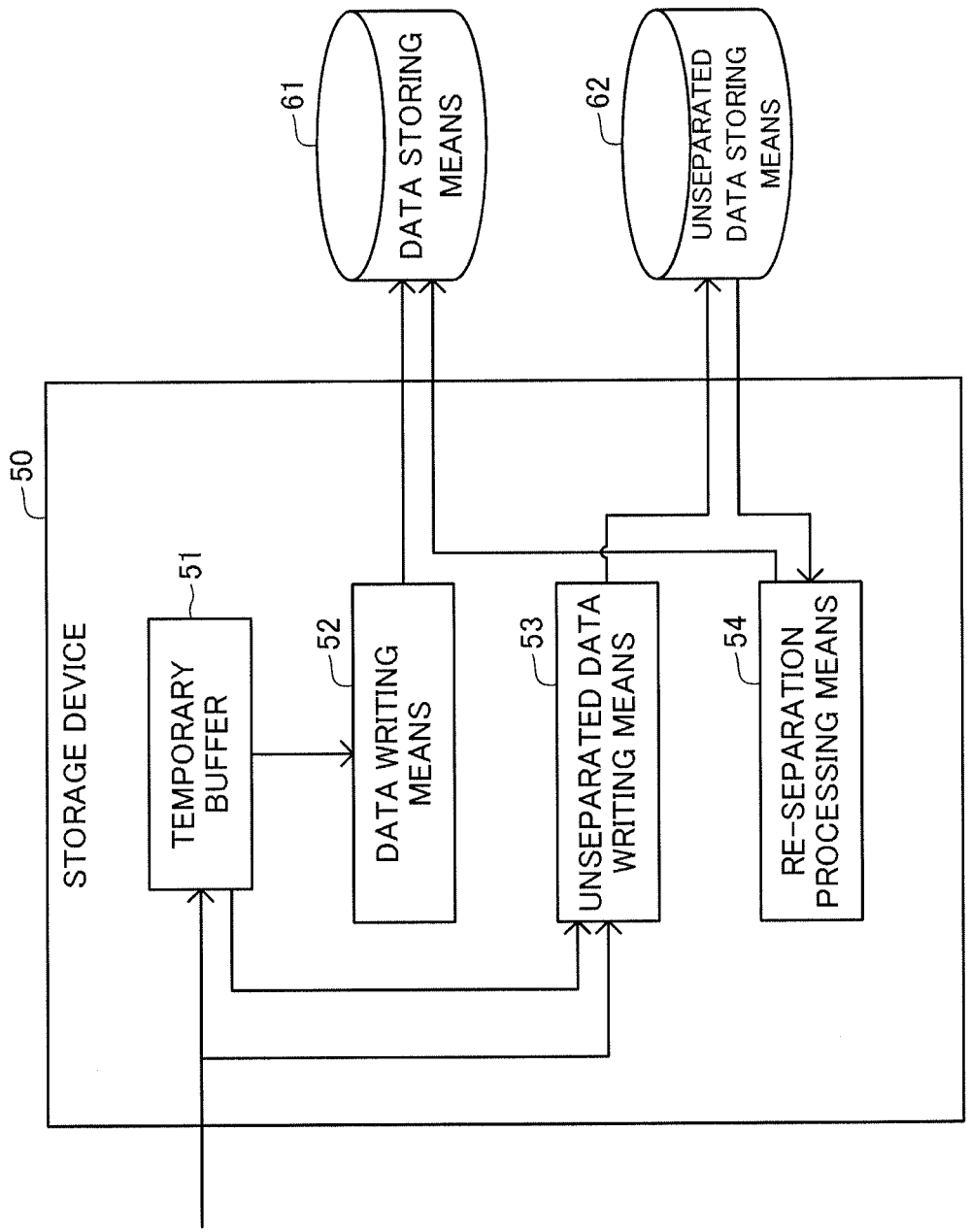

STORAGE DEVICE

CROSS REFERENCE TO RELATED APPLICATIONS

This application is a National Stage of International Application No. PCT/JP2010/006171, filed on Oct. 19, 2010, which claims priority from Japanese Patent Application No. 2010-027125, filed on Feb. 10, 2010, the contents of all of which are incorporated herein by reference in their entirety.

TECHNICAL FIELD

The present invention relates to a storage device, more specifically, a storage device that eliminates duplicated storage of data of the same content.

BACKGROUND ART

In recent years, various kinds of information are digitalized with development and spread of computers. As a device for storing such digital data, there is a storage device such as a magnetic tape and a magnetic disk. Because the amount of data to be stored increases day by day and reaches a huge amount, a mass storage system is required. Moreover, as well as reduction of the cost spent for a storage device, reliability is also required. In addition, it is also required that data can be easily retrieved later. As a result, a storage system that can automatically realize increase of storage capacity and performance, eliminates duplicated storage to reduce a storage cost and has high redundancy is desired.

Under such a circumstance, in recent years, as shown in Patent Document 1, a content-addressable storage system has been developed. A content-addressable storage system distributes and stores data into a plurality of storage devices and, by a unique content address specified depending on the content of the data, specifies a storage position in which the data is stored. To be specific, a content-addressable storage system divides predetermined data into a plurality of fragments and adds a fragment as redundant data, and then stores these fragments into a plurality of storage devices, respectively.

Later, by designating a content address, it is possible to retrieve data, namely, fragments stored in a storage position specified by the content address and restore the predetermined data before being divided from the fragments.

Further, as the content address, for example, a hash value of data generated so as to be unique depending on the content of the data is used. Therefore, in the case of duplicated data, by referring to data in the same storage position, it is possible to acquire data of the same content. Consequently, it is unnecessary to store the duplicated data separately, and it is possible to eliminate duplicated recording and reduce the data capacity.

Further, in a content-addressable storage system, a tree file system is used. In this system, a content address for referring to stored data is referred to with a content address located in an upper hierarchy, and content addresses are stored so as to form a tree structure. Consequently, by tracing the reference destinations of the content address from an upper hierarchy to a lower hierarchy, it is possible to access target stored data.

Here, with reference to FIG. 1, a characteristic of a file in the case of storing a structure file into a tree file system will be described. FIG. 1 shows an aspect of a general structure file. In a content-addressable storage system that has a tree file system, as shown in an upper view of FIG. 1, a file is divided into fragments for each group (referred to as a storage unit hereinafter) for dedupilcation and stored. Then, for example, in a data string such as an archive file and communication data, data includes auxiliary information called a header and a trailer, and can be separated as a group of data (referred to as a separation unit hereinafter).

[Patent Document 1] Japanese Unexamined Patent Application Publication No. 2005-235171

However, in a case that the header or the trailer as part of the data configuring the file described above includes a portion whose value changes depending on a difference in time or number of times, such as a timestamp and a sequential time, the portion interferes with dedupilcation. Here, as shown in a lower view of FIG. 1, a portion that interferes with dedupilcation is specifically presented as a "marker," and a portion whose value does not change in spite of change of time or number of times is presented as "data." The structure of a file 1 shown in the upper view of FIG. 1 is shown in the lower view by using a "marker and "data." As shown in this figure, in a case that a file storage unit includes a "marker," even when the same data is written for the second time or more, the data content as the whole storage unit is not completely the same, so that there arises the problem that dedupilcation of data cannot be executed and the efficiency in data storage lowers.

SUMMARY

Accordingly, an object of the present invention is to solve the decrease in efficiency in data storage, which is the above-mentioned problem.

In order to achieve the object, a storage device of an exemplary embodiment of the present invention includes:

a temporary buffer for sequentially and temporarily storing data configuring a predetermined capacity of file requested to be written every time the data is received from outside;

a data writing means for immediately separating the data stored in the temporary buffer into a data portion and a marker portion corresponding to each other classified in accordance with previously set criteria and storing into a data storing means so that the data portion and the marker portion are associated, and also deleting from the temporary buffer;

an unseparated data writing means for storing the data that cannot be separated into the data portion and the marker portion corresponding to each other among the data stored in the temporary buffer, into an unseparated data storing means; and a re-separation processing means for separating the data stored in the unseparated data storing means into the data portion and the marker portion corresponding to each other in accordance with previously set criteria and storing into the data storing means so that the data portion and the marker portion are associated, and also deleting from the unseparated data storing means.

Further, a program of another exemplary embodiment of the present invention is a program comprising instructions for causing an information processing device equipped with a temporary buffer for sequentially and temporarily storing data configuring a predetermined capacity of file requested to be written every time the data is received from outside, to realize:

a data writing means for immediately separating the data stored in the temporary buffer into a data portion and a marker portion corresponding to each other classified in accordance with previously set criteria and storing into a data storing means so that the data portion and the marker portion are associated, and also deleting from the temporary buffer;

an unseparated data writing means for storing the data that cannot be separated into the data portion and the marker portion corresponding to each other among the data stored in the temporary buffer, into an unseparated data storing means; and a re-separation processing means for separating the data stored in the unseparated data storing means into the data portion and the marker portion corresponding to each other in accordance with previously set criteria and storing into the data storing means so that the data portion and the marker portion are associated, and also deleting from the unseparated data storing means.

Further, a data processing method of another exemplary embodiment of the present invention includes:

sequentially and temporarily storing data configuring a predetermined capacity of file requested to be written into a temporary buffer every time receiving the data from outside;

immediately separating the data stored in the temporary buffer into a data portion and a marker portion corresponding to each other classified in accordance with previously set criteria and storing into a data storing means so that the data portion and the marker portion are associated, and also deleting from the temporary buffer;

storing the data that cannot be separated into the data portion and the marker portion corresponding to each other among the data stored in the temporary buffer, into an unseparated data storing means; and separating the data stored in the unseparated data storing means into the data portion and the marker portion corresponding to each other in accordance with previously set criteria and storing into the data storing means so that the data portion and the marker portion are associated, and also deleting from the unseparated data storing means.

With the configurations described above, the present invention can increase efficiency in data storage.

BRIEF DESCRIPTION OF DRAWINGS

FIG. 7 is an explanation view explaining an aspect of a data storage process in the storage system disclosed in FIG. 4;

FIG. 9 is an explanation view explaining an aspect of a data storage process and a loading process in the storage system disclosed in FIG. 4;

FIG. 10 is an explanation view explaining an aspect at the time of receiving a file in the storage system disclosed in FIG. 4;

FIG. 15 is a function block diagram showing a configuration of a storage system according to Supplementary Note 1.

EXEMPLARY EMBODIMENTS

<First Exemplary Embodiment>

Figure 1:
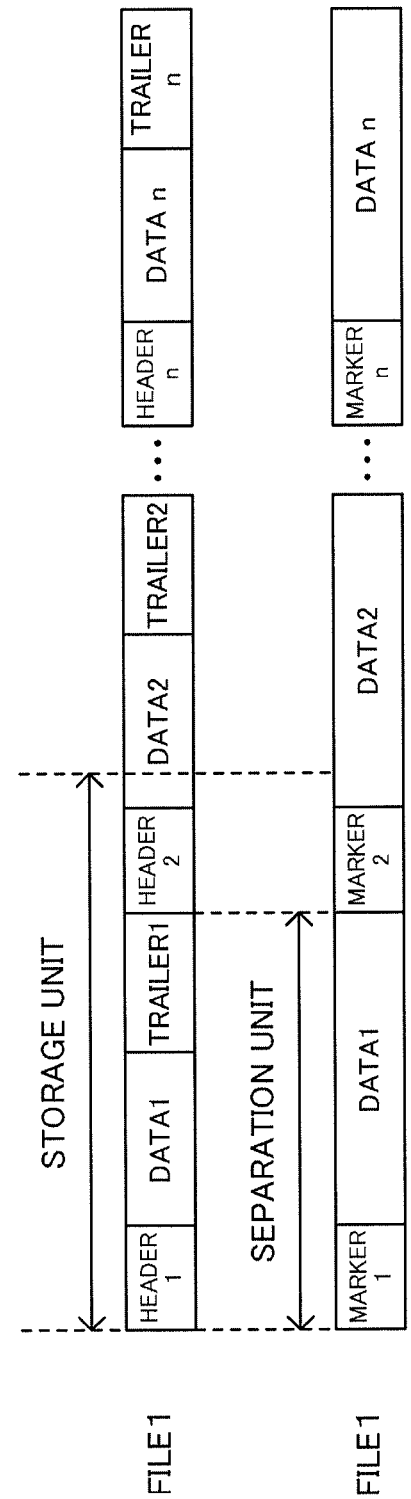
FIG. 1 is a view showing an example of a data structure of a file.
Figure 2:
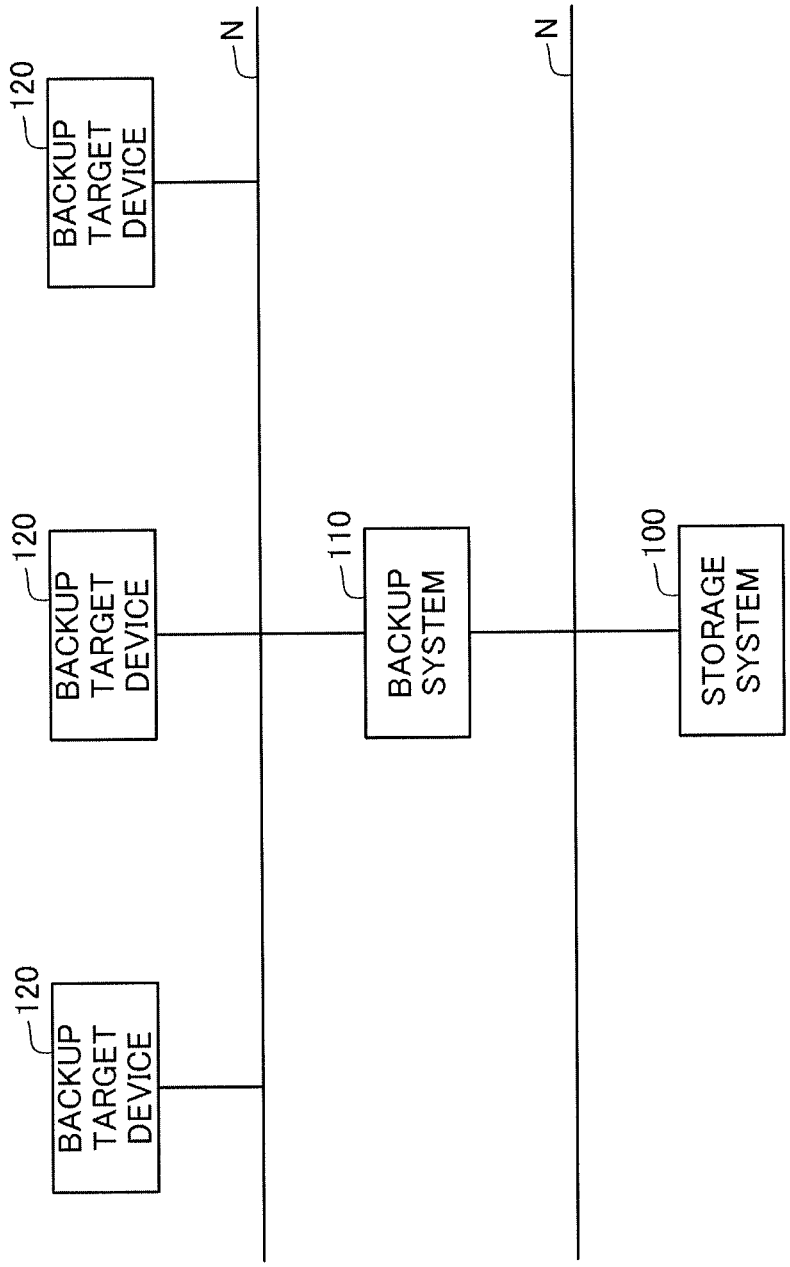
FIG. 2 is a block diagram showing a configuration of a whole system including a storage system according to a first exemplary embodiment of the present invention.
Figure 3:
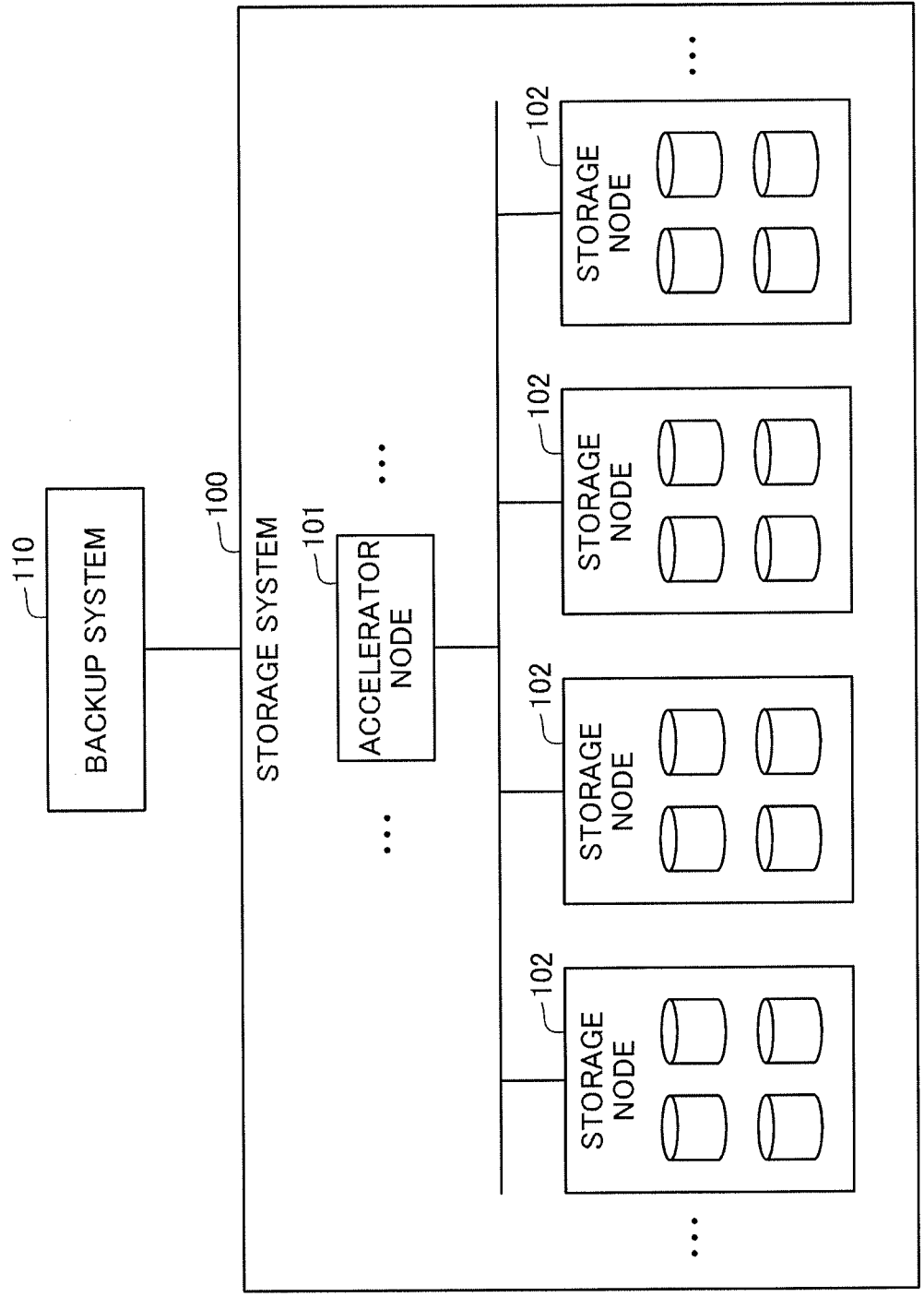
FIG. 3 is a block diagram schematically showing a configuration of the storage system according to the first exemplary embodiment of the present invention.
Figure 4:
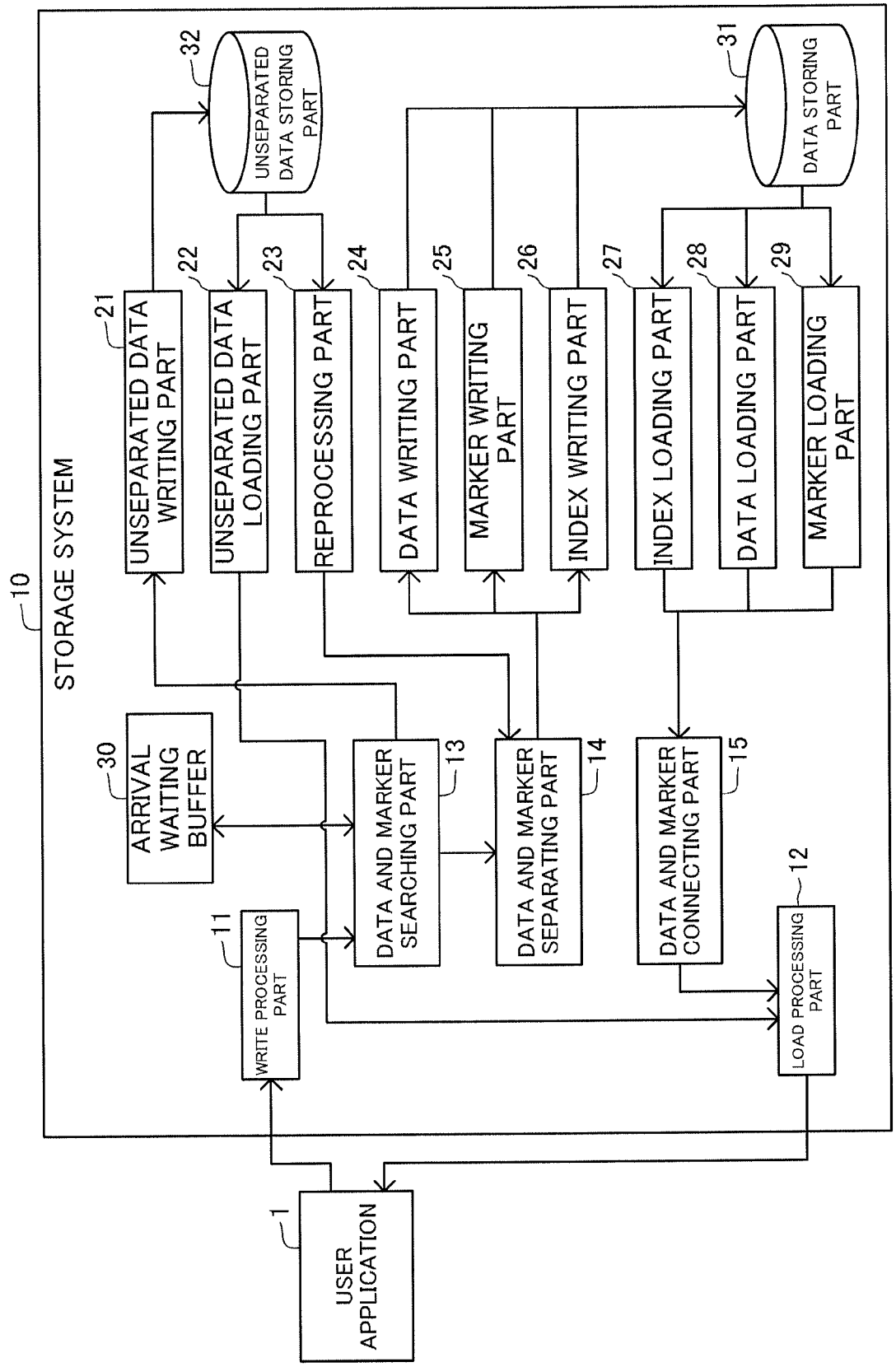
FIG. 4 is a function block diagram showing the configuration of the storage system according to the first exemplary embodiment of the present invention.
Figure 11:
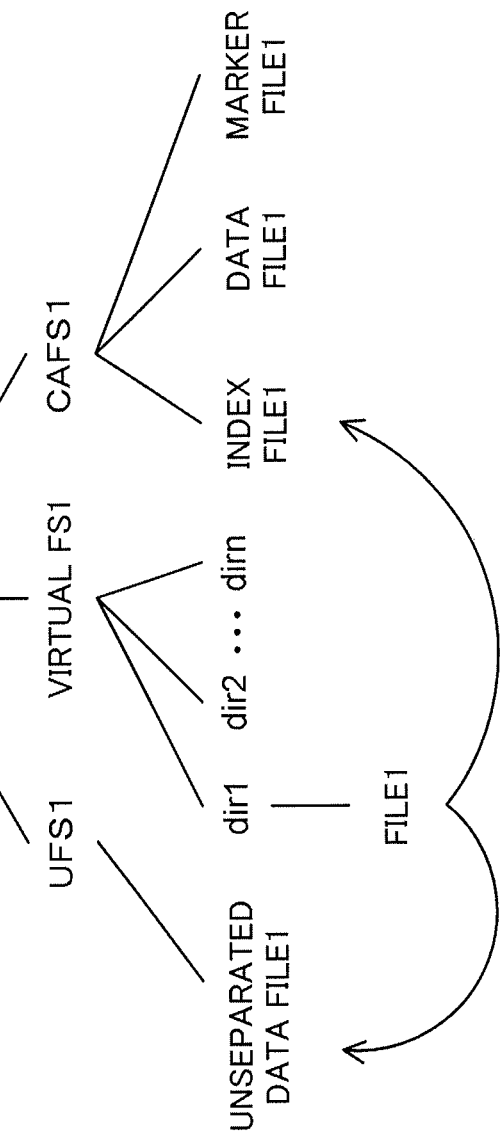
FIG. 11 is an explanation view explaining an aspect of a data storage process in the storage system disclosed in FIG. 4.
Figure 12:
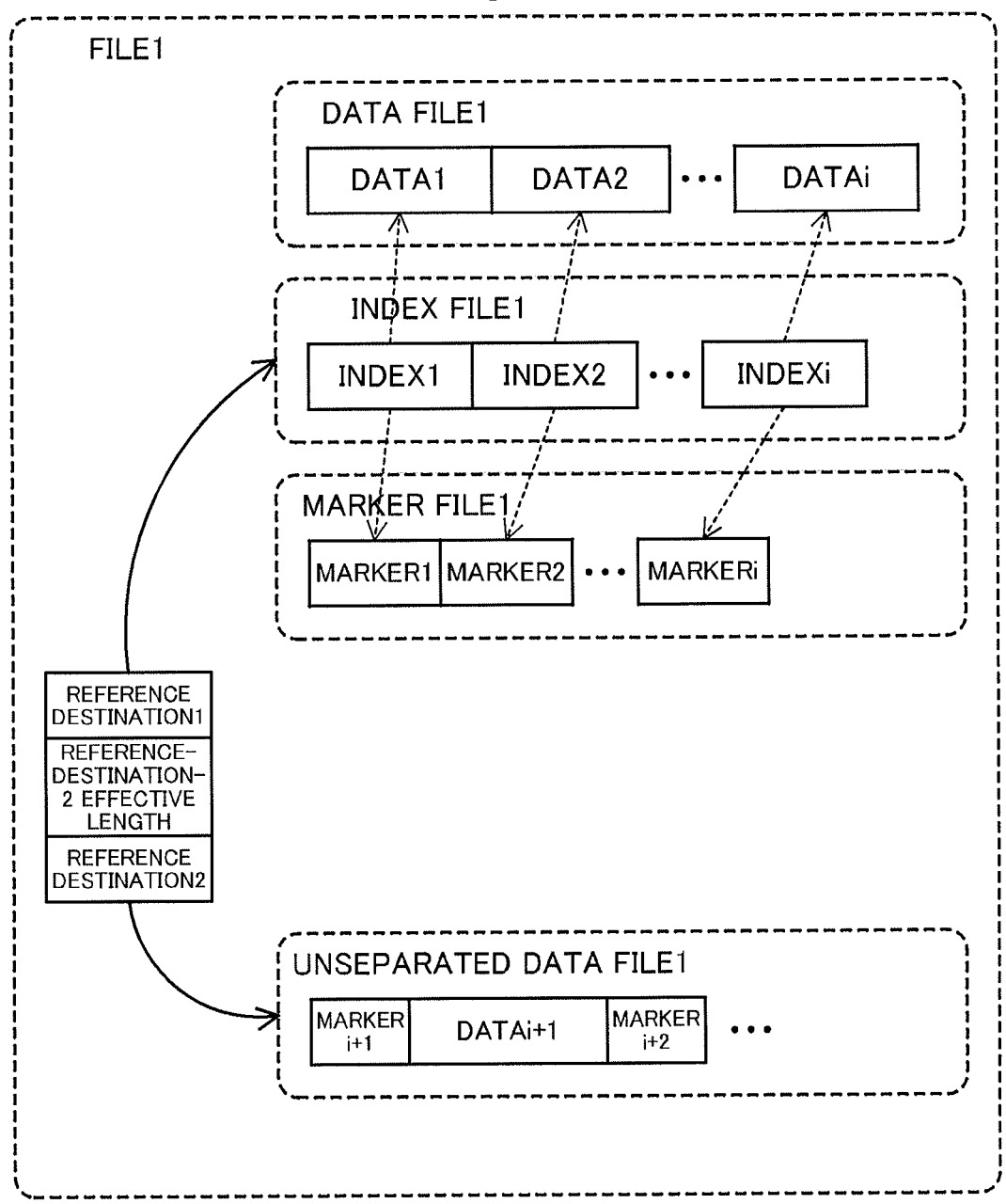
FIG. 12 is an explanation view explaining an aspect of a data storage process in the storage system disclosed in FIG. 4.
Figure 13:
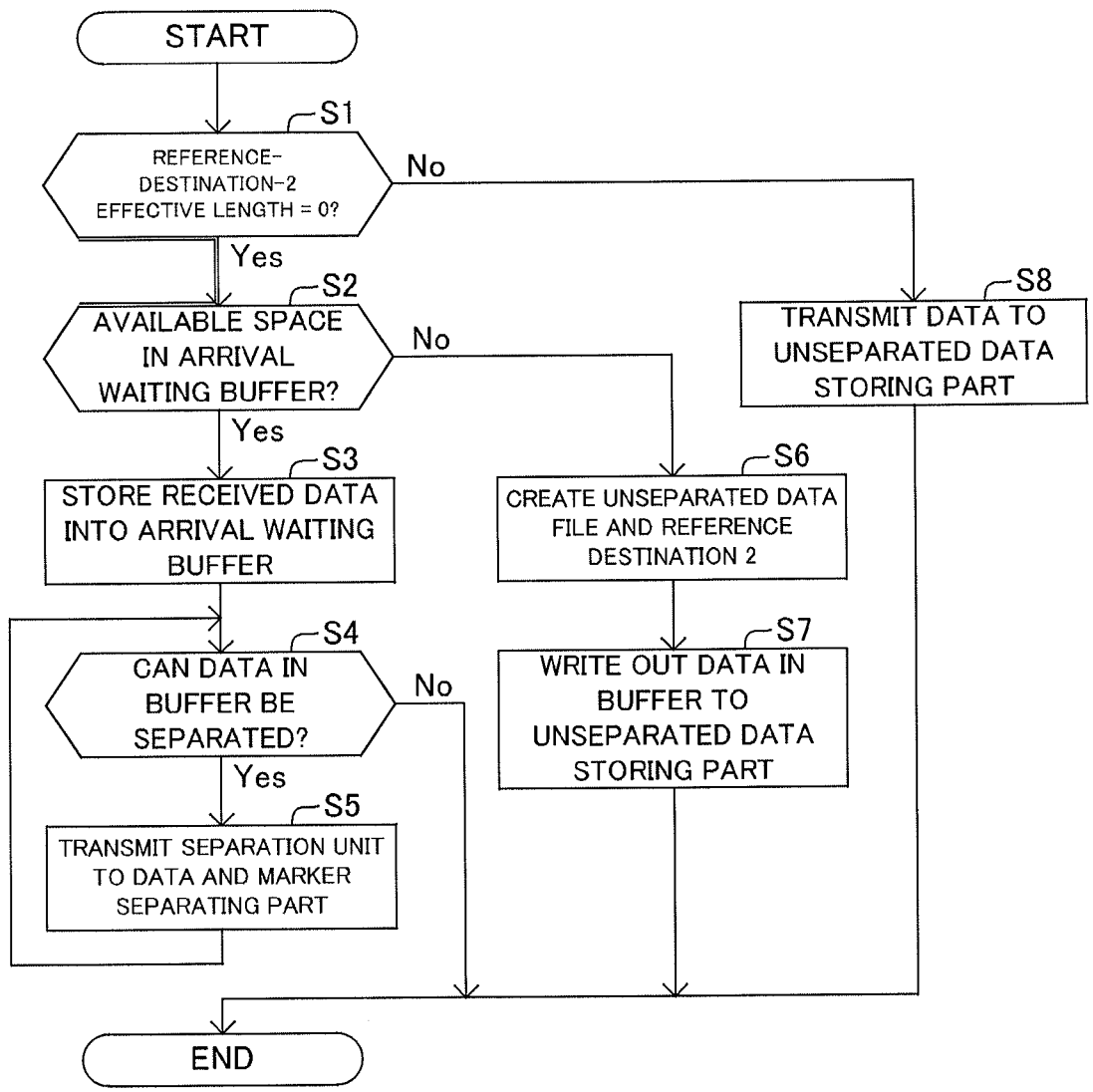
FIG. 13 is a flowchart showing an operation of a data storage process in the storage system disclosed in FIG. 4.
Figure 14:
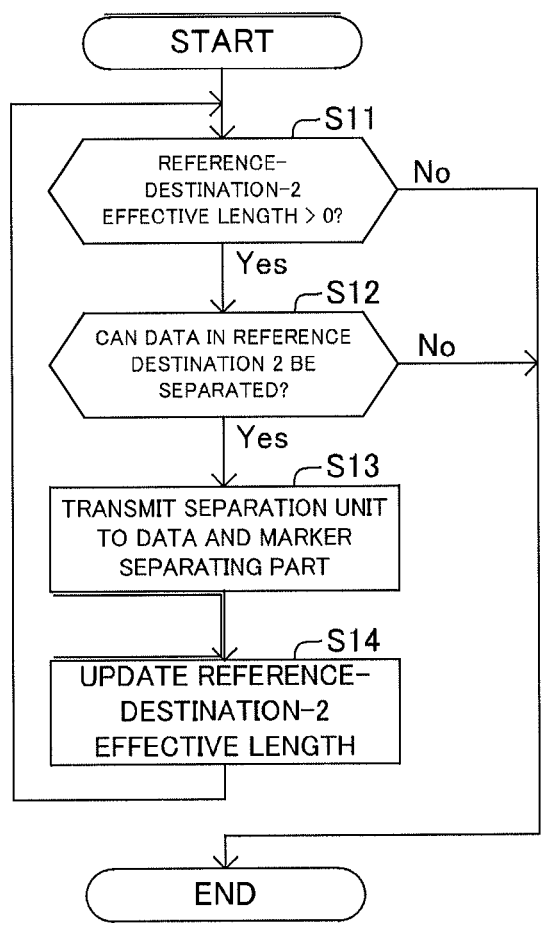
FIG. 14 is a flowchart showing an operation of a data storage process in the storage system disclosed in FIG. 4.

A first exemplary embodiment of the present invention will be described with reference to FIGS. 2 to 14. FIG. 2 is a block diagram showing a configuration of a whole system. FIG. 3 is a block diagram schematically showing a storage system, and FIG. 4 is a function block diagram showing a configuration. FIGS. 5 to 12 are explanation views for explaining an operation of a data storage process in the storage system. FIGS. 13 and 14 are flowcharts showing an operation of the storage system.

This exemplary embodiment shows a specific example of a storage device and the like disclosed in Supplementary Notes described later. Below, a case of configuring the storage system by connecting a plurality of server computers will be described. However, the storage system in the present invention is not limited to be configured by a plurality of computers, and may be configured by one computer.

[Configuration]

As shown in FIG. 2, a storage system 100 according to the present invention is connected to a backup system 110 that controls a backup process via a network N. The backup system 110 acquires backup target data (file) stored in a backup target device 120 connected via the network N, and requests the storage system 100 to store the data. Consequently, the storage system 100 stores the backup target data requested to be stored, as a backup.

As shown in FIG. 3, the storage system 100 in this exemplary embodiment employs a configuration in which a plurality of server computers are connected. To be specific, the storage system 100 includes an accelerator node 101 that is a server computer controlling a storage reproduction operation in the storage system 100, and a storage node 102 that is a server computer equipped with a storage device for storing data. The number of the accelerator node 101 and the number of the storage node 102 are not limited to those shown in FIG. 3, and the system may be configured by connecting more nodes 101 and more nodes 102.

Furthermore, the storage system 100 in this exemplary embodiment is a content-addressable storage system that divides data and makes the data redundant to distribute and store the data into a plurality of storage devices and, by a unique content address set depending on the content of the stored data, specifies a storage position in which the data is stored. This content-addressable storage system will be described in detail later.

Below, assuming the storage system 100 is one system, a configuration and function of the storage system 100 will be described. That is to say, the configuration and function of the storage system 100 described below may be included in either the accelerator node 101 or the storage node 102. The storage system 100 is not necessarily limited to being equipped with the accelerator node 101 and the storage node 102 as shown in FIG. 3, and may have any configuration. For example, the storage system 100 may be configured by one computer. Besides, the storage system 100 is not limited to a content-addressable storage system.

In FIG. 4, a configuration of a storage system 10 in this exemplary embodiment is shown. As shown in this figure, the storage system 10 is connected with a user application 1 that is equivalent to the backup target device 120 and the backup system 110 described above, and executes a process of storing or retrieving a file in response to a request from the user application 1.

The storage system 10 includes a data storing part 31 and an unseparated data storing part 32, each of which is a storage device such as a hard disk drive that stores data. Moreover, the storage system 10 includes an arrival waiting buffer 30 that is a temporary storage device such as a flash memory. Furthermore, the storage system 10 includes a write processing part 11, a load processing part 12, a data and marker searching part 13, a data and marker separating part 14, a data and marker connecting part 15, an unseparated data writing part 21, an unseparated data loading part 22, a reprocessing part 23, a data writing part 24, a marker writing part 25, an index writing part 26, an index loading part 27, a data loading part 28, and a marker loading part 29, which are constructed by installation of a program into an arithmetic device mounted therein.

Actually, the configuration included in the storage system 10 described above is configured by a plurality of arithmetic devices such as CPUs (Central Processing Units) and storage devices included in the accelerator node 101 and the storage node 102 shown in FIG. 3.

As mentioned above, the storage system 10 in this exemplary embodiment is a content-addressable storage system. Therefore, the aforementioned data storing part 31 is a storing part that stores data by using a content address. Then, the data writing part 24, the marker writing part 25 and the index writing part 26 store data by dividing and distributing the data and specifying a storage position by a content address as described below. A data storage process using a content address in the storage system 10 will be described below with reference to FIGS. 5 and 6.

Figure 5:
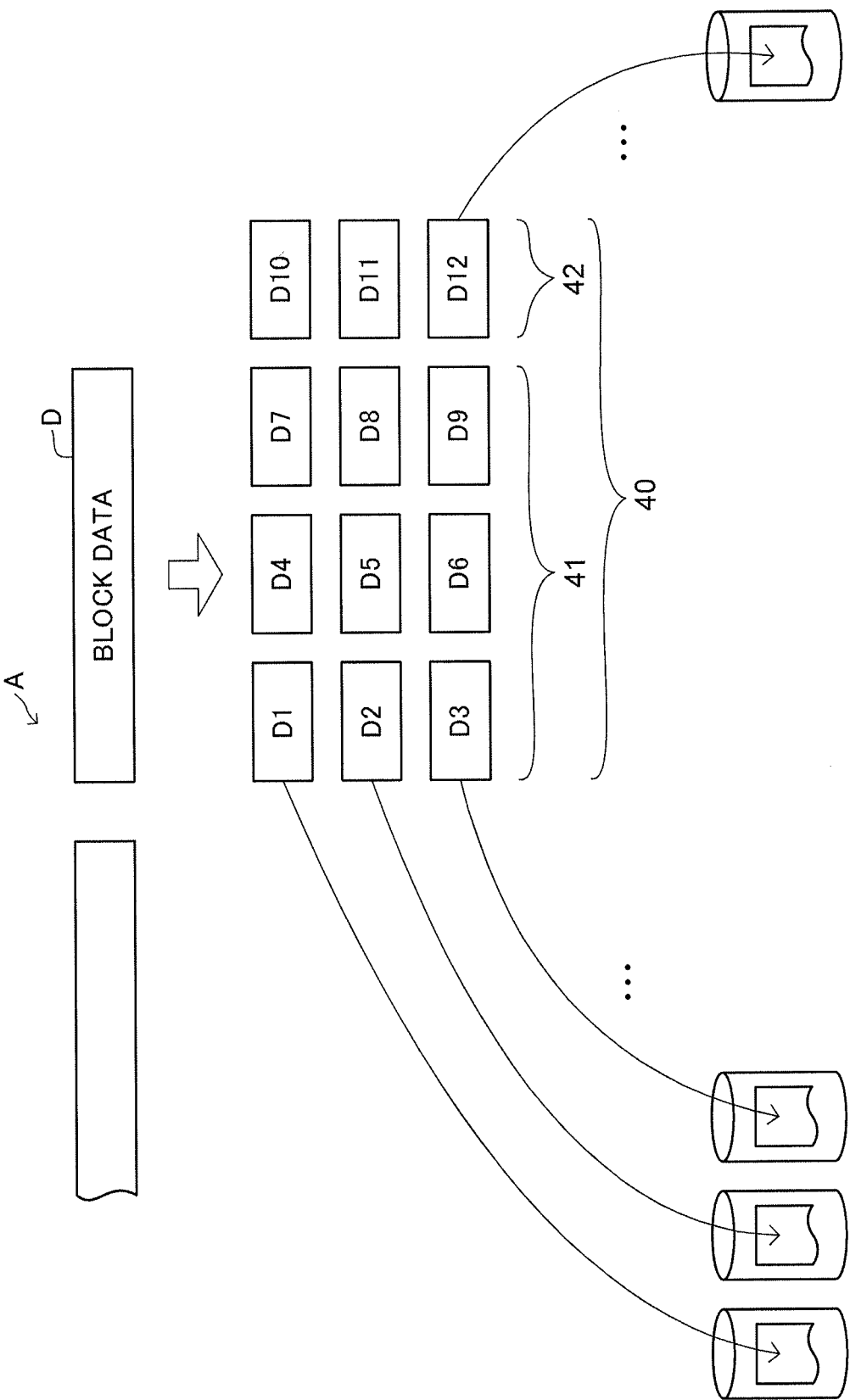
FIG. 5 is an explanation view for explaining an aspect of a data storage process in the storage system disclosed in FIG. 4.
Figure 6:
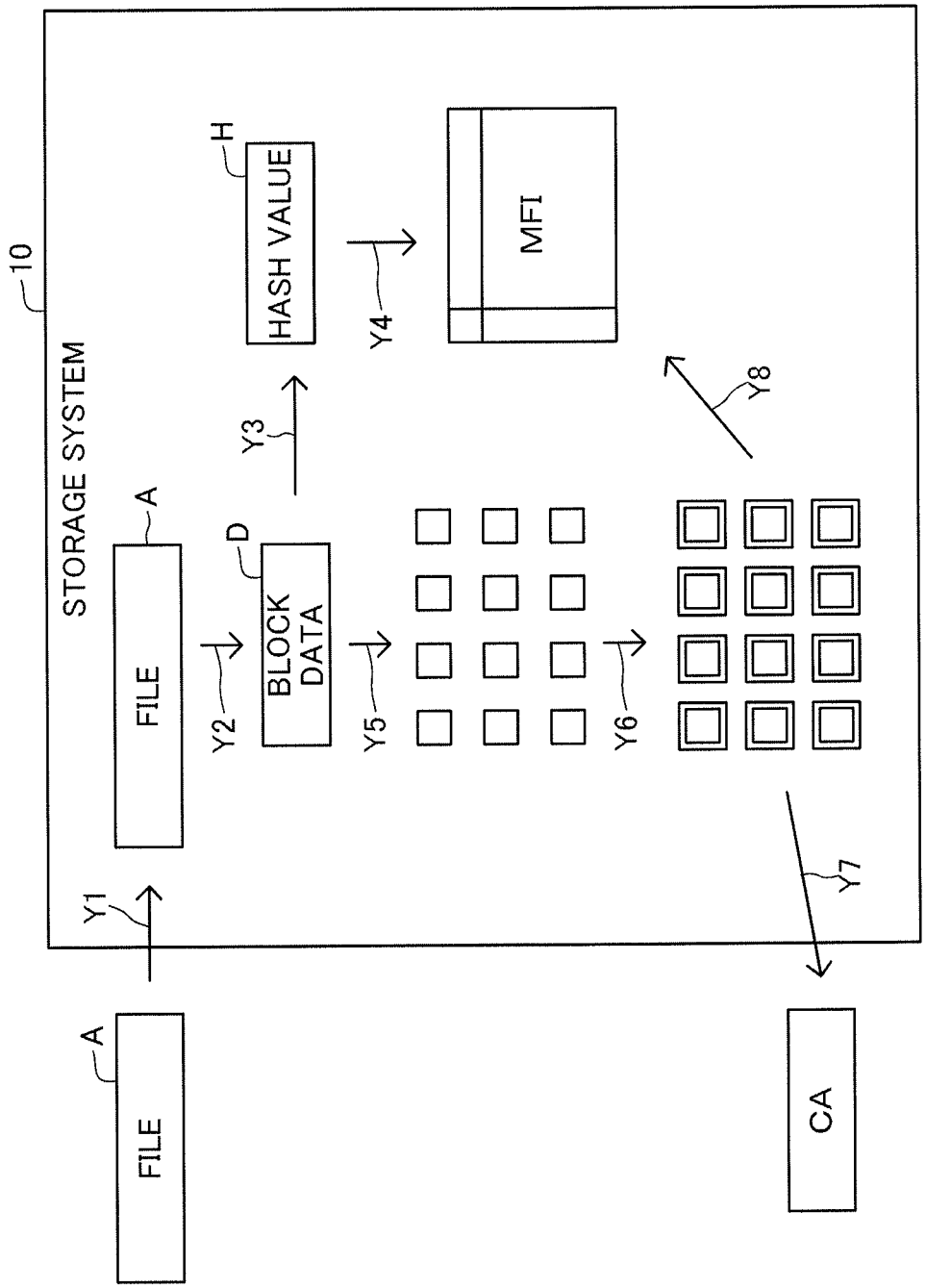
FIG. 6 is an explanation view explaining an aspect of a data storage process in the storage system disclosed in FIG. 4.

At first, as shown in FIG. 5, when accepting an input of a file A requested to be written by the user application 1 (an arrow Y1), the storage system 10 divides the file A into block data D of a predetermined capacity (e.g., 64 KB) as shown by an arrow Y2 in FIGS. 5 and 6. Then, based on a data content of this block data D, the storage system 10 calculates a unique hash value H representing the data content (an arrow Y3). For example, a hash value H is calculated from the data content of block data D by using a previously set hash function.

Subsequently, by using the hash value H of the block data D of the file A, the storage system 10 checks whether the block data D has already been stored. To be specific, firstly, in a case that the block data D has already been stored, the hash value H thereof and a content address CA representing a storage position thereof have been associated and registered in an MFI (Main Fragment Index) file. Therefore, in a case that a hash value H of block data D calculated before being stored exists in the MFI file, it is possible to judge that block data D having the same content has already been stored (an arrow Y4 of FIG. 6). In this case, the storage system 10 acquires a content address CA associated with the hash value H in the MFI, which coincides with the hash value H of the block data D before being stored, from the MFI file. Then, the storage system 10 returns this content address CA as the content address CA of the block data D requested to be written. Consequently, the already stored data referred to with this content address CA is used as the block data D requested to be written, and it is no more necessary to store the block data D requested to be written.

Further, in the case of judging that the block data D requested to be written has not been stored yet, the storage system 10 compresses the block data D and, as shown by an arrow Y5 in FIG. 6, divides the data into a plurality of fragment data of a predetermined capacity. For example, the storage system 10 divides the data into nine pieces of fragment data (division data 41) as shown by reference numerals D1 to D9 in FIG. 5. Moreover, the storage system 10 generates redundant data so that it is possible to restore the original block data even when some of the division fragment data are lost, and adds the redundant data to the division fragment data 41. For example, the storage system 10 adds three pieces of fragment data (redundant data 42) as shown by reference numerals D10 to D12 in FIG. 5. Consequently, a data set 40 that includes twelve pieces of fragment data configured by the nine pieces of division data 41 and the three pieces of redundant data is generated.

Subsequently, the storage system 10 distributes and stores the fragment data configuring the data set generated as described above into storage regions formed on the storage devices, respectively. For example, in the case of generating the twelve pieces of fragment data D1 to D12 as shown in FIG. 5, the storage system 10 stores the fragment data D1 to D12 one by one into data storage files formed in the plurality of storage devices, respectively (refer to an arrow Y6 in FIG. 6).

Subsequently, the storage system 10 generates and manages a content address CA representing a storage position of the fragment data D1 to D12, that is, a storage position of the block data D to be restored from the fragment data D1 to D12 stored as described above. To be specific, the storage system 10 generates the content address CA by combining part (a short hash: e.g., initial 8 B (bytes) of the hash value H) of the hash value H calculated based on the content of the stored block data D with information representing a logical storage position. The storage system 10 then returns this content address CA to a file system in the storage system 10 (an arrow Y7 in FIG. 6). The storage system 10 manages identification information such as a file name of backup target data and the content address CA in association with each other in the file system.

Further, each of the storage nodes 102 manages a content address CA of block data D and a hash value H of the block data D in association with each other in the MFI file. Thus, the content address CA is stored in association with information specifying a file, the hash value H, and so on into the storage device of the accelerator node 101 and the storage nodes 102.

Further, the storage system 10 executes control to retrieve a file stored as described above. For example, when the user application 1 makes a retrieval request with a specific file designated to the storage system 10, the storage system 10 firstly designates a content address CA composed of part of a hash value corresponding to the file requested to be retrieved and logical position information, based on the file system. Then, the storage system 10 checks whether the content address CA is registered in the MFI file. When the content address CA is not registered, the requested data is not stored, so that the storage system 10 returns error.

On the other hand, when the content address CA relating to the retrieval request is registered, the storage system 10 specifies a storage position designated by the content address CA, and retrieves each fragment data stored in this specified storage position, as data requested to be retrieved. At this moment, in a case that data storage files storing the respective fragments and the storage position of the fragment data of one of the data storage files are known, it is possible to specify the storage position of other fragment data based on the same storage position.

Then, the storage system 10 restores block data D from the respective fragment data retrieved in response to the retrieval request. Moreover, the storage system 10 connects a plurality of restored block data D, restores into a group of data like a file A, and returns it.

Thus, the storage system 10 in this exemplary embodiment eliminates duplication of data, and has a configuration for further increasing the efficiency in data storage. The configuration will be described in detail.

At the beginning, the storage system 10 in this exemplary embodiment includes the data and marker separating part 14 as mentioned above. This data and marker separating part 14 separates data into a "data" portion, which is an actual data portion of a file and whose value is not changed by a generation time, the number of updates or the like, and a "marker" portion, which is a timestamp, a serial number or the like and whose value changes depending on a difference in time, number of updates or the like. The data and marker separating part 14 separates partial data configuring a file requested to be written by the user application 1 into a "data" portion and a "marker" portion at predetermined timing. At this moment, as described later, partial data that are data configuring a file requested to be written and are sequentially transmitted are stored into the arrival waiting buffer 30 or the unseparated data storing part 32, and the data and marker separating part 14 retrieves the data from either the arrival waiting buffer 30 or the unseparated data storing part 32 to separate into a "data" portion and a "marker" portion depending on a situation. Here, a basic operation of a data separation process by the data and marker separating part 14 will be described.

Here, a configuration of a file system constructed in the storage system 10 includes, for example, a UNIX™ file system UFS1 (UFS: Unix File System) that is generally used to store an unseparated data file, a content address file system CAFS1 (CAFS: Content Address File System) that stores separated data and markers so that the data and the markers can be referred to by indexes, and a virtual FS1 that allows indirect reference to files stored in these two file systems. The virtual FS1 (FS: File System) includes a tree file system. For example, write access to the file 1 represents a write request by the user application 1.

However, the name, point to be mounted, and so on of the file system are not limited to those mentioned above. Moreover, a reference destination may be implemented like a symbolic link file, or may be implemented by calculation using a unique value such as an i-node number. Moreover, the virtual file system may be realized by change of OS (Operating System) Kernel or addition of a Kernel module, or may be realized by using a technique of creating a file system in a user space typified by FUSE (File system in User Space). The configuration of the present invention is not limited to these techniques.

FIG. 7 shows an aspect when partial data configuring the file 1 stored in the arrival waiting buffer 30 is separated into a "data" portion and a "marker" portion. In this case, firstly, the storage system 10 sequentially receives partial data configuring the file 1 and stores into the arrival waiting buffer 30. As soon as the partial data is stored into the arrival waiting buffer 30, the data and marker separating part 14 separates the partial data stored in the arrival waiting buffer 30 into a "data" portion and a "marker" portion. This separation process will be referred to as an "in-line system."

Then, the partial data configuring the file is provided with index information so that the "data" portion and the "marker" portion having been separated can be connected at the time of loading and, as shown by a lower view of FIG. 7, separated and stored into three files including a data file and a marker file that are linked from the index information (refer to FIG. 9). Then, a reference destination of the file 1 is directed to the index file.

Among the abovementioned three files, the data file is expected to bring an effect of deduplication, but either the index file or the marker file is not much expected to bring an effect of deduplication. Therefore, it is the most efficient to store only the data file into the data storing part 31 that stores by using a content address. However, it is also possible to store the index file and the marker file into the data storing part 31 by using the content address.

It is possible to refer to a file from the user application 1 via the load processing part 12. For example, index information corresponding to the file 1 on the virtual file system, data and marker are retrieved and connected (refer to FIG. 9), the file 1 is thereby restored and transmitted to the user application 1.

Figure 8:
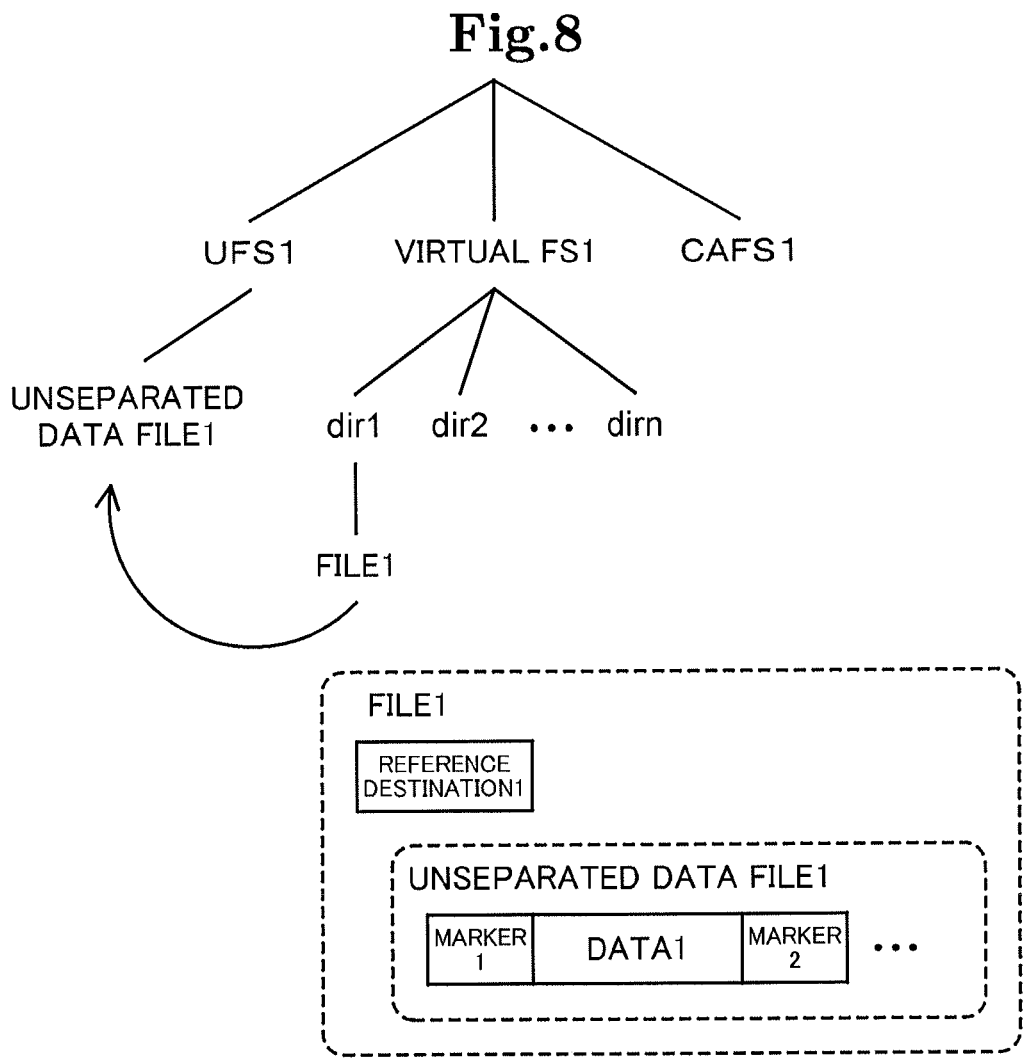
FIG. 8 is an explanation view explaining an aspect of a data storage process in the storage system disclosed in FIG. 4.

Next, FIG. 8 shows a process of separating partial data stored in the unseparated data storing part 32 by the data and marker separating part 14. This separation process will be referred to as an "off-line system."

In this case, firstly, when a request to write the file 1 is made by the user application 1, the file 1 is stored as an unseparated data file 1 into the unseparated data storing part 32 as shown in a lower view of FIG. 8. At this moment, as shown in FIG. 8, the file 1 on the virtual file system (virtual FS) 1 does not have an entity and only has a reference destination thereof. For example, this may be implemented like a symbolic link file, or the reference destination may be obtained by calculation using an i-node number of the file. It is desirable that the unseparated data storing part 32 as the reference destination is not a content-addressable storage system but a general file system. This is because the file 1 includes a marker at this moment and it is difficult to perform deduplication of such a file and data.

When the file 1 is all written and closed, the partial data stored in the unseparated data storing part 32 is separated into a "data" portion and a "marker" portion by the data and marker separating part 14. At this moment, for loading later, index information is added so that the "data" portion and the "marker" portion can be connected. When all of the partial data are separated, as shown in FIGS. 7 and 9, the data are separated into three files including the data file and the marker file that are linked by the index information and stored into the data storing part 31 by using content addresses. At this moment, a reference destination of the file 1 is directed to the unseparated data file.

After the file 1 is stored into the data storing part 31 as described above, the file stored in the unseparated data storing part 32 may be immediately deleted, or may be left therein when there is a sufficient available space. Alternatively, for the purpose of dealing with shortage of an available space, for example, files may be deleted in ascending order of use frequency by LRU (Least Recently Used) control. This is because when updating or adding a file, it is possible to create a file image in the unseparated data storing part 32 again and thereafter use as a cache image for separating into data and markers again.

Further, it is also possible to load the file 1 from the unseparated data storing part 32. For example, at the time of loading the file 1 on the virtual file system from the user application 1, it is judged based on the reference destination of the file 1 whether the target file is in the unseparated data storing part 32 or the data storing part 31. When the target file is in the unseparated data storing part 32, the content of the file 1 is acquired from the unseparated data storing part 32. Moreover, when the target data is in the data storing part 31, as described above, index information is acquired, and a data portion and a marker portion that are linked by the index information are connected (refer to FIG. 9) and thereby restored into an original file.

In the abovementioned method of writing the file 1, there is a case of increasing multiplicity in communication in order to acquire a higher speed of writing via the network. Particularly in a case that latency is long, the multiplicity is increased and window control is executed to acquire a broader band. In this case, as shown in FIG. 10, there is a case that part of a file does not arrive. For example, NFS (Network File System) commonly implemented in UNIX OS such as Linux and Solaris acquires a broader band by employing a method in which file offset is shown and data arrive independently. In a file system used in general, it is possible to write by shifting offset.

However, in the case of storing data and marker in the separated state, a structure of scanning a file from the beginning is provided because a marker indicates a next marker in general. Therefore, when part of data has not arrived, there is a need to buffer and suspend scan until all of the data arrive.

At this moment, it is possible to consider a method of returning no response to arrival of data, and a method of returning retry and waiting until a not-arrived portion arrives. However, in a case that partial data is separated into data and marker by the in-line system, a time to complete storage of all of the data becomes longer and the throughput becomes lower. On the other hand, it is possible to abandon separation of following partial data into data and marker in order to avoid decrease of the throughput, but a deduplication ratio becomes low in this case.

In the method of separating partial data into data and marker by the off-line system, all of the partial data are once stored into the unseparated data storing part and are later subjected to the separation process together. Therefore, writing by shifting offset can be executed without any problem. However, an additional storage space is required, and it takes long time to complete storage of data.

Accordingly, the storage system 10 in this exemplary embodiment has a configuration as described below in order to limit an additional storage space while increasing the deduplication efficiency.

At first, the write processing part 11 accepts a write request from the user application 1. Then, the data and marker searching part 13 temporarily stores partial data configuring a file requested to be written and sequentially received from the user application 1, into the arrival waiting buffer 30 (a temporal buffer). At this moment, the data and marker searching part 13 immediately searches the partial data stored in the arrival waiting buffer 30 to determine whether a "data" portion and a "marker" portion corresponding to each other exist.

For search of partial data configuring a file to determine whether a "data" portion and a "marker" portion corresponding to each other exist, criteria for distinguishing a "data" portion and a "marker" portion within predetermined data are previously set, and portions corresponding to the criteria are specified a "data" portion and a "marker" portion corresponding to each other. For example, a specific data format to be judged as a "marker" portion is previously set, and when a portion with this data format exists in a searched region, this portion is judged as a "marker" portion. Then, based on the data content of the "marker" portion, the "marker" portion and a "data" portion associated therewith are determined as a "marker" portion and a "data" portion corresponding to each other.

Here, the "data" portion is, for example, data corresponding to a data content of a file, namely, data that is not changed by a situation at the time of storage of a timestamp or the like. Moreover, the "marker" portion is data that is changed by a situation at the time of storage of the file, for example, data whose value changes depending on a difference in time, number of updates or the like, such as a timestamp and a serial number.

After searching out a "data" portion and a "marker" portion corresponding to each other, the data and marker searching part 13 transmits data in this range to the data and marker separating part 14. At this moment, the data in the range transmitted to the data and marker separating part 14 is deleted from the arrival waiting buffer 30.

Upon acceptance of the data, the data and marker separating part 14 immediately separates the data in the range transmitted from the data and marker searching part 13 into a "data" portion and a "marker" portion. At this moment, as described above, the data and marker separating part 14 separates the data into a "data" portion and a "marker" portion based on previously set criteria. Then, as described above, the data writing part 24, the marker writing part 25 and the index writing part 26 distribute and store the "data" portion, the "marker" portion and an "index" linking the "data" portion and the "marker" portion into the data storing part 31 by using a content address.

To summarize, the storage system 10 in this exemplary embodiment has a data writing function (a data writing means) by the in-line system described below. At first, partial data configuring the file 1 requested to be written by the user application 1 is stored into the arrival waiting buffer 30 every time received. Simultaneously, when data that can be separated into a data portion and a marker portion corresponding to each other in accordance with previously set criteria exists in the partial data sequentially stored in the arrival waiting buffer 30, the data is separated and stored into the data storing part 31 and also deleted from the arrival waiting buffer 30. That is to say, in the arrival waiting buffer 30, among the partial data configuring the file 1 requested to be written, data that cannot be separated into a "data" portion and a "marker" portion corresponding to each other is left.

Further, in the case of judging that the arrival waiting buffer 30 has no more space to store partial data when accepting the partial data configuring the file 1, the data and marker searching part 13 in this exemplary embodiment transmits all of the partial data having been stored in the arrival waiting buffer 30 to the unseparated data writing part 21. Moreover, the data and marker searching part 13 sequentially transmits the partial data received from the user application 1 to the unseparated data writing part 21.

Then, the unseparated data writing part 21 (an unseparated data writing means) stores the data transmitted by the data and marker searching part 13 into the unseparated data storing part 32. That is to say, the unseparated data writing part 21 stores, into the unseparated data storing part 32, unseparated partial data configuring the file 1 having been stored in the arrival waiting buffer 30 and remaining partial data configuring the file 1 accepted from the user application 1 after all available space of the arrival waiting buffer 30 is run out.

The unseparated data writing part 21 stores "effective length information" representing the data amount of the partial data stored from the arrival waiting buffer 30 into the unseparated data storing part 32, into a storage device mounted in the storage system 10. For example, the unseparated data writing part 21 subtracts an offset on the file 1 equivalent to the beginning of the partial data stored in the arrival waiting buffer 30 from an offset on the file 1 equivalent to the end, and stores the result as effective length information of the partial data stored in the unseparated data storing part 32. Furthermore, the unseparated data writing part 21 adds the data amount of the partial data configuring the file 1 received from the user application 1 and stored in the unseparated data storing part 32, that is, adds an offset on the file 1 to the effective length information to update the effective length information.

Further, at a moment that the file 1 requested to be written by the user application 1 is closed, that is, after the write processing part 11 receives all of the partial data configuring the file 1, the reprocessing part 23 starts a process of separating the data stored in the unseparated data storing part 32. To be specific, the reprocessing part 23 transmits the data stored in the unseparated data storing part 32 to the data and marker separating part 14. At this moment, the reprocessing part 23 deletes the data transmitted to the data and marker separating part 14 from the unseparated data storing part 32. Then, as described above, the data and marker separating part 14 separates the data stored in the unseparated data storing part 32 into a "data" portion and a "marker" portion corresponding to each other in accordance with previously set criteria, and stores into the data storing part 31 by using a content address.

At this moment, the reprocessing part 23 causes the data and marker separating part 14 to separate the data stored in the unseparated data storing part 32, and then subtracts a value of the separated data from the stored effective length information.

To summarize, the storage system 10 in this exemplary embodiment has a data writing function (an unseparated data writing means, a re-separation processing means) by the off-line system below. At first, when all available space of the arrival waiting buffer 30 is run out, data in the buffer 30 is stored into the unseparated data storing part 32, and the remaining partial data configuring a file received from the user application 1 is also stored into the unseparated data storing part 32, not stored into the arrival waiting buffer 30. Then, at a moment that the file 1 requested to be written by the user application 1 is closed, data stored in the unseparated data storing part 32 is separated into a "data" portion and a "marker" portion corresponding to each other, and stored into the data storing part 31 with a content address.

When the aforementioned "effective length information" becomes "0," that is, when separation of all of the partial data stored in the unseparated data storing part 32 is completed, the data and marker searching part 13 described above sequentially stores partial data of a file relating to a write request received from the user application 1 into the arrival waiting buffer 30 again. Then, in the same manner as described above, the separation process by the in-line system is executed until the arrival waiting buffer 30 becomes full.

Further, upon acceptance of a file loading request from the user application 1, the load processing part 12 (a data loading means) judges which the target file is stored in the unseparated data storing part 32 or the data storing part 31, and loads partial data configuring the file from the storing part that stores the file. Then, in a case that the file is stored in the unseparated data storing part 32, the load processing part 12 loads the data via the unseparated data loading part 22. Moreover, in a case that the file is stored in the data storing part 31, the load processing part 12 loads a "data" portion and a "marker" portion based on index information from the data storing part 31 via the data loading part 28, the marker loading part 29 and the index loading part 27, connects in the data and marker connecting part 15 to restore the file, and loads the file.

[Operation]

Next, an operation of the storage system 10 described above will be explained with reference to FIGS. 11 to 14. At first, when the file 1 is created in the virtual file system by a write request from the user application 1, the data file 1, the marker file 1, and the index file 1 are prepared as shown in FIG. 12. At this moment, a reference destination 1, a reference-destination-2 effective length (effective length information), and a reference destination 2 are initialized. Here, the reference-destination-2 effective length is initialized to "0."

Moreover, the reference destination 1 presents the index file, and the reference destination 2 is blank because prepared later.

Then, when the file is written, the data and marker searching part 13 executes a process by the in-line system because the reference-destination-2 effective length is "0" (step S1: Yes). To be specific, the data and marker searching part 13 confirms whether there is an available space in the arrival waiting buffer and, when there is an available space (step S2: Yes), sequentially stores partial data of the file 1 received from the user application 1 into the arrival waiting buffer 30 (step S3).

Then, when there is data that can be separated into a "data" portion and a "marker" portion corresponding to each other in the arrival waiting buffer 30 (step S4: Yes), the data and marker searching part 13 sequentially transmits the data that can be separated within a designated separation range to the data and marker separating part 14, and deletes the data from the arrival waiting buffer 30 (step S5). When there are a plurality of data that can be separated, the data and marker searching part 13 transmits all of the data to the data and marker separating part 14, and deletes the data from the arrival waiting buffer 30.

After that, the data and marker separating part 14 sequentially separates the data transmitted from the data and marker searching part 13 and stored into the arrival waiting buffer 30, into "data" portions and "marker" portions corresponding to each other. Then, the data and marker separating part 14 links the "data" portions and "marker" portions with index data and stores into the data storing part 31 by using content addresses, as shown in FIGS. 11 and 12. At this moment, a reference destination of the file 1 is directed to an index file.

As a result of the process by the in-line system described above, data that cannot be separated among partial data configuring the file 1 is left in the arrival waiting buffer 30, and thereafter, all available space of the arrival waiting buffer 30 is run out (step S2: No). Then, the data and marker searching part 13 creates the unseparated data file 1 in the unseparated data storing part 32 as shown in FIGS. 11 and 12, and sets the "reference destination 2" so as to present the unseparated data file 1 (step S6). Then, the data and marker searching part 13 writes out all of the data in the arrival waiting buffer 30 into the unseparated data file 1 in the unseparated data storing part 32. At this moment, the data and marker searching part 13 subtracts an offset on the file equivalent to the beginning from an offset on the file equivalent to the end in the arrival waiting buffer 30, and records the result as the "reference-destination-2 effective length." Consequently, because the value of the "reference-destination-2 effective length" is not "0" any more (step S1: No), a process by the out-line system is executed.

When thus executing the operation by the off-line system (step S1: No), the storage system 10 writes by adding the partial data configuring the file received from the user application 1 to the unseparated data file 1 in the unseparated data storing part 32 (step S8). At this moment, in a case that the effective length of the unseparated data file 1 presented by the "reference destination 2" increases, the storage system 10 updates the "reference-destination-2 effective length." When partial data that is a not-arrived portion as a missing portion between data and data having been received heretofore on the file arrives, the storage system 10 regards it as update of the file and does not update the effective length.

After that, when reception of data, namely, writing of a file from the user application 1 finishes and the file is closed, a re-separation process by the reprocessing part 23 is started. To be specific, firstly, because effective data is stored in the "reference destination 2" and the "reference-destination-2 effective length" is not "0" (step S11: Yes), the reprocessing part 23 checks whether there is data that can be separated from among the data in the unseparated data file 1 of the "reference destination 2." In a case that there is data that can be separated (step S12: Yes), the reprocessing part 23 transmits data of a separation unit in the unseparated data file 1 stored in the unseparated data storing part 32 to the data and marker separating part 14, and deletes the portion from the reference destination 2 (step S13).

The data and marker separating part 14 separates the transmitted data into a "data" portion and a "marker" portion corresponding to each other in the same manner as described above. Then, as shown in FIGS. 11 and 12, the data and marker separating part 14 links the portions with index data and stores into the data storing part 31 by using a content address. At this moment, a reference destination of the file 1 is directed to the index file.

Then, as described above, after separation of the data in the unseparated data storing part 32, the reprocessing part 23 decreases the "reference-destination-2 effective length" by a separated portion (step S14). Thus, the reprocessing part 23 executes reprocessing until all of the data are separated, that is, the "reference-destination-2 effective length" becomes 0. Consequently, the file is finally stored into the data storing part 31 with a content address.

As described above, when the "reference-destination-2 effective length" returns to "0," the separation process returns to the in-line system.

Thus, according to the storage device in this exemplary embodiment, a "marker" portion is extracted from a file, and data is stored in the state separated into a "data" portion and the "marker" portion," so that it is possible to effectively store the data portion with a high duplication ratio and eliminate duplication of data.

Further, because separation into a "data" portion and a "marker portion" is switched between the in-line system and the off-line system when the buffer amount exceeds a given amount, it is possible to limit a storage capacity while increasing throughput.

[Supplementary Notes]

The whole or part of the exemplary embodiments disclosed above can be described as the following supplementary notes. Below, the outline of a configuration of a storage device 50 according to the present invention will be described with reference to FIG. 15. Moreover, configurations of a program and a data processing method according to the present invention will be described. However, the present invention is not limited to the configurations below.

(Supplementary Note 1)

A storage device 50, comprising:

a temporary buffer 51 for sequentially and temporarily storing data configuring a predetermined capacity of file requested to be written every time the data is received from outside;

a data writing means 52 for immediately separating the data stored in the temporary buffer 51 into a data portion and a marker portion corresponding to each other classified in accordance with previously set criteria and storing into a data storing means 61 so that the data portion and the marker portion are associated, and also deleting from the temporary buffer;

an unseparated data writing means 53 for storing the data that cannot be separated into the data portion and the marker portion corresponding to each other among the data stored in the temporary buffer 51, into an unseparated data storing means 62; and a re-separation processing means 54 for separating the data stored in the unseparated data storing means 62 into the data portion and the marker portion corresponding to each other in accordance with previously set criteria and storing into the data storing means 61 so that the data portion and the marker portion are associated, and also deleting from the unseparated data storing means 62.

(Supplementary Note 2)

The storage device according to Supplementary Note 1, wherein the unseparated data writing means is configured to, when an available space in the temporary buffer is run out, store the data stored in the temporary buffer into the unseparated data storing means, and also sequentially store the data received from outside into the unseparated data storing means every time the data is received.

(Supplementary Note 3)

The storage device according to Supplementary Note 2, wherein the re-separation processing means is configured to operate after all of the data configuring the file are received from outside.

(Supplementary Note 4)

The storage device according to any of Supplementary Notes 1 to 3, wherein the unseparated data writing means is configured to store effective length information representing a data amount of the data stored in the unseparated data storing means.

(Supplementary Note 5)

The storage device according to Supplementary Note 4, wherein:

the re-separation processing means is configured to, when the data stored in the unseparated data storing means is stored into the data storing means, subtract a value of a data amount of the data from the effective length information; and the temporary buffer is configured to, depending on a value of the effective length information, sequentially and temporarily store data received from outside.

(Supplementary Note 6)

The storage device according to Supplementary Note 5, wherein the temporary buffer is configured to, in a case that the value of the effective length information is 0, sequentially and temporarily store data received from outside.

(Supplementary Note 7)

The storage device according to any of Supplementary Notes 1 to 6, comprising a data loading means for, in response to a request to load the file from outside, loading the data configuring the file from the data storing means or the unseparated data storing means, in which the data is stored.

(Supplementary Note 8)

The storage device according to any of Supplementary Notes 1 to 7, wherein:

the data portion is data corresponding to a data content of the file; and the marker portion is data changing depending on a situation when the file is stored.

(Supplementary Note 9)

A program comprising instructions for causing an information processing device equipped with a temporary buffer for sequentially and temporarily storing data configuring a predetermined capacity of file requested to be written every time the data is received from outside, to realize:

a data writing means for immediately separating the data stored in the temporary buffer into a data portion and a marker portion corresponding to each other classified in accordance with previously set criteria and storing into a data storing means so that the data portion and the marker portion are associated, and also deleting from the temporary buffer;

an unseparated data writing means for storing the data that cannot be separated into the data portion and the marker portion corresponding to each other among the data stored in the temporary buffer, into an unseparated data storing means; and a re-separation processing means for separating the data stored in the unseparated data storing means into the data portion and the marker portion corresponding to each other in accordance with previously set criteria and storing into the data storing means so that the data portion and the marker portion are associated, and also deleting from the unseparated data storing means.

(Supplementary Note 10)

The program according to Supplementary Note 9, wherein the unseparated data writing means is configured to, when an available space in the temporary buffer is run out, store the data stored in the temporary buffer into the unseparated data storing means, and also sequentially store the data received from outside into the unseparated data storing means every time the data is received.

(Supplementary Note 11)

A data processing method, comprising:

sequentially and temporarily storing data configuring a predetermined capacity of file requested to be written into a temporary buffer every time receiving the data from outside;

immediately separating the data stored in the temporary buffer into a data portion and a marker portion corresponding to each other classified in accordance with previously set criteria and storing into a data storing means so that the data portion and the marker portion are associated, and also deleting from the temporary buffer;

storing the data that cannot be separated into the data portion and the marker portion corresponding to each other among the data stored in the temporary buffer, into an unseparated data storing means; and separating the data stored in the unseparated data storing means into the data portion and the marker portion corresponding to each other in accordance with previously set criteria and storing into the data storing means so that the data portion and the marker portion are associated, and also deleting from the unseparated data storing means.

(Supplementary Note 12)

The data processing method according to Supplementary Note 11, comprising, when an available space in the temporary buffer is run out, storing the data that cannot be separated into the data portion and the marker portion corresponding to each other among the data stored in the temporary buffer, into the unseparated data storing means, and also sequentially storing the data received from outside into the unseparated data storing means every time receiving the data.

Although the present invention has been described with reference to the respective exemplary embodiments, the present invention is not limited to the exemplary embodiments. The configuration and details of the present invention can be altered in various manners that can be understood by those skilled in the art within the scope of the present invention.

The present invention is based upon and claims the benefit of priority from Japanese patent application No. 2010-27125, filed on Feb. 10, 2010, the disclosure of which is incorporated herein in its entirety by reference.

DESCRIPTION OF REFERENCE NUMERALS 10 storage system
11 write processing part
12 load processing part
13 data and marker searching part
14 data and marker separating part
15 data and marker connecting part
21 unseparated data writing part
22 unseparated data loading part
23 reprocessing part
24 data writing part
25 marker writing part
26 index writing part
27 index loading part
28 data loading part
29 marker loading part
30 arrival waiting buffer
31 data storing part
32 unseparated data storing part
40 data set
41 division data
42 redundant data
50 storage device
51 temporary buffer
52 data writing means
53 unseparated data writing means
54 re-separation processing means
61 data storing means
62 unseparated data storing means
100 storage system
101 accelerator node
102 storage node
110 backup system
120 backup target device

The invention claimed is:

1. A storage device, comprising:

a temporary buffer for sequentially and temporarily storing data configuring a predetermined capacity of a file requested to be written every time the data is received from outside;

a data writing unit for immediately separating a subset of the data stored in the temporary buffer into a data portion and a marker portion corresponding to each other classified in accordance with previously set criteria and storing into a data storing unit so that the data portion and the marker portion are associated, and also deleting from the temporary buffer;

an unseparated data writing unit for storing the data that have not been separated into the data portion and the marker portion corresponding to each other among the data stored in the temporary buffer, into an unseparated data storing unit; and a re-separation processing unit for separating the data stored in the unseparated data storing unit into the data portion and the marker portion corresponding to each other in accordance with previously set criteria and storing into the data storing unit so that the data portion and the marker portion are associated, and also deleting from the unseparated data storing unit, wherein the re-separation processing unit is configured to operate after all of the data configuring the file are received from outside, wherein the unseparated data writing unit is configured to store effective length information representing a data amount of the data stored in the unseparated data storing unit, and wherein:

the re-separation processing unit is configured to, when the data stored in the unseparated data storing unit is stored into the data storing unit, subtract a value of the data amount of the data from the effective length information; and the temporary buffer is configured to, depending on a value of the effective length information, sequentially and temporarily store data received from outside.

2. The storage device according to claim 1, wherein the unseparated data writing unit is configured to, when an available space in the temporary buffer is run out, store the data stored in the temporary buffer into the unseparated data storing unit, and also sequentially store the data received from outside into the unseparated data storing unit every time the data is received.

3. The storage device according to claim 1, wherein the temporary buffer is configured to, in a case that the value of the effective length information is 0, sequentially and temporarily store data received from outside.

4. The storage device according to claim 1, comprising a data loading unit for, in response to a request to load the file from outside, loading the data configuring the file from the data storing unit or the unseparated data storing unit, in which the data is stored.

5. The storage device according to claim 1, wherein:
the data portion is data corresponding to a data content of the file; and
the marker portion is data changing depending on a situation when the file is stored.

6. A non-transitory computer-readable storage medium that stores a program comprising instructions for causing an information processing device equipped with a temporary buffer for sequentially and temporarily storing data configuring a predetermined capacity of a file requested to be written every time the data is received from outside, to realize:
a data writing unit for immediately separating a subset of the data stored in the temporary buffer into a data portion and a marker portion corresponding to each other classified in accordance with previously set criteria and storing into a data storing unit so that the data portion and the marker portion are associated, and also deleting from the temporary buffer;
an unseparated data writing unit for storing the data that have not been separated into the data portion and the marker portion corresponding to each other among the data stored in the temporary buffer, into an unseparated data storing unit; and
a re-separation processing unit for separating the data stored in the unseparated data storing unit into the data portion and the marker portion corresponding to each other in accordance with previously set criteria and storing into the data storing unit so that the data portion and the marker portion are associated, and also deleting from the unseparated data storing unit,
wherein the re-separation processing unit is configured to operate after all of the data configuring the file are received from outside,
wherein the unseparated data writing unit is configured to store effective length information representing a data amount of the data stored in the unseparated data storing unit, and
wherein:
the re-separation processing unit is configured to, when the data stored in the unseparated data storing unit is stored into the data storing unit, subtract a value of the data amount of the data from the effective length information; and
the temporary buffer is configured to, depending on a value of the effective length information, sequentially and temporarily store data received from outside.

7. A data processing method, comprising:
sequentially and temporarily storing data configuring a predetermined capacity of a file requested to be written into a temporary buffer every time receiving the data from outside;
immediately separating a subset of the data stored in the temporary buffer into a data portion and a marker portion corresponding to each other classified in accordance with previously set criteria and storing into a data storing means so that the data portion and the marker portion are associated, and also deleting from the temporary buffer;
storing the data that have not been separated into the data portion and the marker portion corresponding to each other among the data stored in the temporary buffer, into an unseparated data storing unit; and
separating the data stored in the unseparated data storing unit into the data portion and the marker portion corresponding to each other in accordance with previously set criteria and storing into the data storing unit so that the data portion and the marker portion are associated, and also deleting from the unseparated data storing unit,
wherein the separating the data stored in the unseparated data storing unit occurs after all of the data configuring the file are received from outside,
wherein the storing the data includes storing effective length information representing a data amount of the data stored in the unseparated data storing unit, and
wherein:
the separating the data includes, when the data stored in the unseparated data storing unit is stored into the data storing means, subtracting a value of the data amount of the data from the effective length information; and
the temporary buffer is configured to, depending on a value of the effective length information, sequentially and temporarily store data received from outside.

8. A storage device, comprising:
a temporary buffer for sequentially and temporarily storing data configuring a predetermined capacity of a file requested to be written every time the data is received from outside;
a data writing unit for immediately separating a subset of the data stored in the temporary buffer into a data portion and a marker portion corresponding to each other classified in accordance with previously set criteria and storing into a data storing unit so that the data portion and the marker portion are associated, and also deleting from the temporary buffer;
an unseparated data writing unit for storing the data that have not been separated into the data portion and the marker portion corresponding to each other among the data stored in the temporary buffer, into an unseparated data storing unit; and
a re-separation processing unit for separating the data stored in the unseparated data storing unit into the data portion and the marker portion corresponding to each other in accordance with previously set criteria and storing into the data storing unit so that the data portion and the marker portion are associated, and also deleting from the unseparated data storing unit,
wherein the unseparated data writing unit is configured to store effective length information representing a data amount of the data stored in the unseparated data storing unit,
and wherein:
the re-separation processing unit is configured to, when the data stored in the unseparated data storing unit is stored into the data storing unit, subtract a value of the data amount of the data from the effective length information; and
the temporary buffer is configured to, depending on a value of the effective length information, sequentially and temporarily store data received from outside.

9. The storage device according to claim 8, wherein the temporary buffer is configured to, in a case that the value of the effective length information is 0, sequentially and temporarily store data received from outside.

* * * * *